(12) United States Patent
Hirsch et al.

(10) Patent No.: US 9,608,540 B2
(45) Date of Patent: Mar. 28, 2017

(54) METHOD AND DEVICE FOR CONTROLLING AN INVERTER

(71) Applicant: Robert Bosch GmbH, Stuttgart (DE)

(72) Inventors: Michele Hirsch, Esslingen (DE); Ulrich Schuster, Berlin (DE); Tino Merkel, Schwieberdingen (DE); Andrea Deflorio, Marbach Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/409,748

(22) PCT Filed: Apr. 23, 2013

(86) PCT No.: PCT/EP2013/058410
§ 371 (c)(1),
(2) Date: Dec. 19, 2014

(87) PCT Pub. No.: WO2013/189632
PCT Pub. Date: Dec. 27, 2013

(65) Prior Publication Data
US 2015/0155795 A1    Jun. 4, 2015

(30) Foreign Application Priority Data
Jun. 22, 2012  (DE) .......................... 10 2012 210 648

(51) Int. Cl.
*H02P 6/14*    (2016.01)
*H02M 7/48*    (2007.01)
(Continued)

(52) U.S. Cl.
CPC ............... *H02M 7/48* (2013.01); *H02M 1/32* (2013.01); *H02M 7/53875* (2013.01);
(Continued)

(58) Field of Classification Search
CPC ............... H02M 7/5395; H02M 5/458; H02M 2001/327; H02M 2001/344; H02M 3/335;
(Continued)

(56) References Cited

U.S. PATENT DOCUMENTS 5,631,819 A    5/1997  Masaki et al.
2009/0179608 A1*  7/2009  Welchko ........... H02M 7/53875
                                                            318/801
(Continued)

FOREIGN PATENT DOCUMENTS

DE           10393516      10/2005
DE        102008040144      1/2010

OTHER PUBLICATIONS

International Search Report for Application No. PCT/EP2013/058410 dated Apr. 16, 2014 (English Translation, 2 pages).

*Primary Examiner* — Marlon Fletcher
(74) *Attorney, Agent, or Firm* — Michael Best & Friedrich LLP

(57) ABSTRACT

The invention relates to a method (60) for controlling an inverter (10) using space-vector pulse width modulation, in particular to control an electric machine (14), said inverter (10) being equipped with a plurality of controllable switches (S) and being designed to provide a polyphase electric current (IU, IV, IW), in particular to supply multiphase electric current to an electric machine (14). In said method, a reference phase angle (alpha_R) is predefined, and the inverter (10) is controlled in such a way that a plurality of different successive switching states (V0-V7) is established for the switches (S) in order to provide the electric current (IU, IV, IW) in the form of a current space vector (I*). The inverter (10) is controlled in such a way that the current space vector (I*) is provided at a phase angle (alpha_I) which differs from the reference phase angle (alpha_R), a difference (delta_I) of the phase angle (alpha_I) from the (Continued)

reference phase angle (alpha_R) being determined according to a power loss (PA, PB, PC) and/or a temperature (TA, TB, TC) of at least one of the switches (S).

13 Claims, 6 Drawing Sheets

(51) Int. Cl.
    *H02M 1/32* (2007.01)
    *H02M 7/5387* (2007.01)
    *H02P 21/06* (2016.01)
    *H02M 1/00* (2006.01)

(52) U.S. Cl.
    CPC ..... *H02P 21/06* (2013.01); *H02M 2001/0054* (2013.01); *H02M 2001/327* (2013.01); *H02M 2007/53876* (2013.01); *Y02B 70/1491* (2013.01)

(58) Field of Classification Search
    CPC ........ H02P 5/74; H02P 27/06; H02P 29/0088; H02P 29/0033; H02P 21/00; H02P 29/0044; H02P 9/30; H02P 29/0061; B60L 2240/549; B60L 2240/527; B60L 2240/529
    See application file for complete search history.

(56) References Cited

U.S. PATENT DOCUMENTS

| | | | |
|---|---|---|---|
| 2012/0086374 A1* | 4/2012 | Arisawa | H02M 7/5387 318/400.32 |
| 2014/0233280 A1* | 8/2014 | Saito | H02M 5/293 363/37 |
| 2014/0233289 A1* | 8/2014 | Zhao | H02M 7/5395 363/131 |
| 2015/0022217 A1* | 1/2015 | Wang | B60L 3/0069 324/539 |
| 2015/0236628 A1* | 8/2015 | Wang | H02M 7/5395 318/139 |
| 2015/0340982 A1* | 11/2015 | Deflorio | H02M 7/42 318/139 |
| 2015/0357934 A1* | 12/2015 | Hirsch | H02P 29/0088 318/400.02 |
| 2016/0094177 A1* | 3/2016 | Shimomugi | H02M 7/53875 318/400.2 |
| 2016/0111973 A1* | 4/2016 | Deflorio | H02P 27/06 318/400.02 |
| 2016/0315558 A1* | 10/2016 | Lee | H02M 7/537 |

* cited by examiner

METHOD AND DEVICE FOR CONTROLLING AN INVERTER

BACKGROUND OF THE INVENTION

The present invention relates to a method for controlling an inverter by means of space vector modulation, in particular for controlling an electric machine, wherein the inverter includes a plurality of controllable switches and is designed to provide a polyphase electric current, in particular in order to supply an electric machine with electric current in a polyphase form, wherein a reference phase angle is predefined, wherein the inverter is controlled in such a way that a plurality of different consecutive switching states of the switches is configured, in order to provide the electric current in the form of a current space vector.

The present invention furthermore relates to a device for controlling an inverter, in particular for controlling an electric machine, wherein the inverter includes a plurality of controllable switches which are connected for providing a polyphase electric current as a function of a reference phase angle, in particular in order to supply the electric machine with current in a polyphase form, including a control unit which is designed to control the inverter in such a way that the inverter assumes a plurality of consecutive different switching states of the switches, in order to provide the current in the form of a current space vector.

The present invention furthermore relates to a motor vehicle drive train including at least one electric machine for providing drive power, an inverter for controlling the electric machine, and including a device for controlling the inverter of the type described above.

Various control methods are known in the technical field of three-phase loads in general and electric three-phase machines in particular. Currently, the method of space vector modulation is generally preferred for controlling the three-phase load. In this control method, a space vector is formed by the consecutive setting of eight basic voltage vectors. In order to provide the phase voltage, the basic voltage vectors are switched in a pulse width-modulated manner, so that a corresponding control voltage is generated.

In the known control methods, the electrical loads are controlled by means of an inverter using power semiconductor switches. The setting of the eight consecutive basic voltage vectors for generating the voltage space vector is implemented by alternating the switching on and switching off of certain power semiconductor switches of the inverters. At very low rotational speeds of the space vector, or if the three-phase load is an electric machine, at low rotational speeds of the controlled electric machines, some of the power semiconductor switches are connected very frequently or for a very long time and are thus thermally loaded by an electric current flowing for a very long time or very frequently. Therefore, the power semiconductor switches must be designed for very long switch-on times and for very large currents, generally making the inverter technically complex.

In order to counteract an overload, in particular, a thermal overload, of the power semiconductor switches, it is, for example, provided in WO 2010/000548A2 to omit one of two switching states which switch to zero potential in certain pulse width modulation periods, in order to minimize the switching losses of the power semiconductor switches.

Since the load, in particular the thermal load, of individual power semiconductor switches of the inverter is a function of a phase angle of the provided current space vector, or some of the power semiconductor switches of the inverter are loaded differently for certain phase angles of the provided current space vector, it is, for example, provided in DE 10393516 T1 to use a certain zero vector in certain angle ranges of the provided current space vector in order to reduce the switching losses of the power semiconductor switches.

This has the disadvantage that in certain control situations, in particular at very low rotational speeds of the current space vector, some of the power semiconductor switches are permanently thermally loaded, and thus in certain situations, the inverter is loaded non-uniformly, and it is not possible to avoid overloading some of the power semiconductor switches.

SUMMARY OF THE INVENTION

According to the present invention, a method is therefore provided for controlling the inverter by means of space vector modulation of the kind initially specified, wherein the inverter is controlled in such a way that the current space vector is provided having a phase angle which deviates from the reference phase angle, wherein the deviation of the phase angle from the reference phase angle is determined as a function of a power dissipation and/or a temperature of at least one of the switches.

Furthermore, according to the present invention, a device is therefore provided for controlling an inverter of the kind initially specified, wherein the control unit is designed to control the inverter in such a way that the current space vector is provided having a phase angle which deviates from the reference phase angle, wherein the deviation of the phase angle from the reference phase angle is determined based on a power dissipation and/or a temperature of at least one of the switches.

Finally, according to the present invention, a motor vehicle drive train is provided including at least one electric machine for providing drive power, an inverter for controlling the electric machine, and including a device for controlling the inverter of the kind described above.

As a result of the current space vector being provided having a phase angle which is different from the reference phase angle, one of the controllable switches may be relieved in certain situations in which the controllable switch is in particular thermally overloaded or is on the verge of being overloaded, by the current space vector being provided having a phase angle which relieves the overloaded controllable switch and loads a different controllable switch more heavily.

As a result, the load of the controllable switches or of the phases of the inverter may be varied, and the inverter may thus be loaded more uniformly with respect to phase. As a result, a current space vector may thus also be provided for critical phase angles which does not unilaterally overload the inverter or the phases of the inverter. Thus, the controllable switches may generally be designed for lower peak load values, thereby making it generally possible to manufacture the inverter in a less technically complex and more economical manner. Furthermore, the more uniform load on the switches or the phases of the inverter results in the lifetime of the inverter generally being increased.

Preferably, the power dissipation and/or the temperature of two or three switches, which have the maximum losses and/or the maximum temperature of all switches, is/are taken into account.

As a result, peak values of the load on the switches may be detected and reduced using simple means.

It is particularly preferred if the deviation is set in such a way that the maximum losses of the two or the three switches are essentially equal or deviate from each other at most by a predefined value.

As a result, it is possible to set a uniform load on the switches or the phases of the inverter.

Furthermore, it is preferred if the deviation is determined as a function of a change function of the power dissipation, and wherein the change function forms the change in the power dissipation of at least one switch as a function of the deviation of the phase angle.

As a result, the influence of the phase angle on the change in the power dissipation and thus in the temperature of the controllable switches may be taken into account, and the phase angle may be changed in a targeted manner, in order to achieve a uniform load.

Furthermore, it is preferred if the phase angle is increased if the temperature of one of the switches is greater than the temperature of the other switches and a value of the change function is less than a predefined value range, and wherein the deviation is decreased if a value of the change function is greater than a predefined value range, and wherein the deviation is kept constant if the value of the change function lies within the predefined value range.

As a result, since not only the absolute value of the power dissipation and/or the temperature are taken into account, but the influence of the phase angle on the power dissipation in the controllable switch is also taken into account, the power dissipation and/or the temperature of the controllable switch which is most heavily loaded may be adjusted rapidly and precisely.

It is particularly preferred if the change function forms the change in the power dissipation of two switches as a function of the deviation of the phase angle.

As a result, the influence of the phase angle on the relative load on two of the switches may also be taken into account, thus making the adjustment of the power dissipation and/or the temperature particularly effective, and making it possible to counteract a non-uniform load on the inverter rapidly and effectively.

Furthermore, it is particularly preferred if the deviation is increased if the temperature of two of the three switches is essentially equal and the value of the change function is less than a predefined value range, and wherein the deviation is decreased if the value of the change function is greater than the predefined value range, and wherein the deviation is kept constant if the value of the change function lies within the value range.

As a result, it is possible to respond individually to the particular temperature distribution, thus making the method for setting a uniform load on the inverter particularly effective.

Furthermore, it is preferred if the change function forms the change in the power dissipation of the switch having the highest temperature, as a function of the deviation of the phase angle.

As a result, it is possible to reduce or prevent peak loads of one of the switches in a particularly effective manner.

It is also preferred if the inverter furthermore includes a plurality of flyback diodes, and wherein the deviation of the phase angle is furthermore determined as a function of a power dissipation and/or a temperature of at least one of the flyback diodes.

As a result, it is also possible to take into account the loads of the flyback diodes, thus making it possible to reduce the load of individual flyback diodes in general and to design the flyback diodes for lower peak loads.

It is particularly preferred if an electric machine is controlled by means of the inverter, and wherein the reference phase angle is determined as a function of a rotor angle of the electric machine, in particular corresponds to the rotor angle.

As a result, it is also possible to control the electric machine for lower rotational speeds by means of the inverter, without overloading individual controllable switches.

Overall, it is thus possible to relieve the phases of the inverter or individual controllable switches and/or individual flyback diodes, and to load the inverter more uniformly in general, since a deviation of the current phase angle or a variation of the current phase angle has a rather minor effect on the controllable load.

It is to be understood that features, properties, and advantages of the method according to the present invention also correspondingly apply to or are applicable to the device according to the present invention.

DETAILED DESCRIPTION

Figure 1:
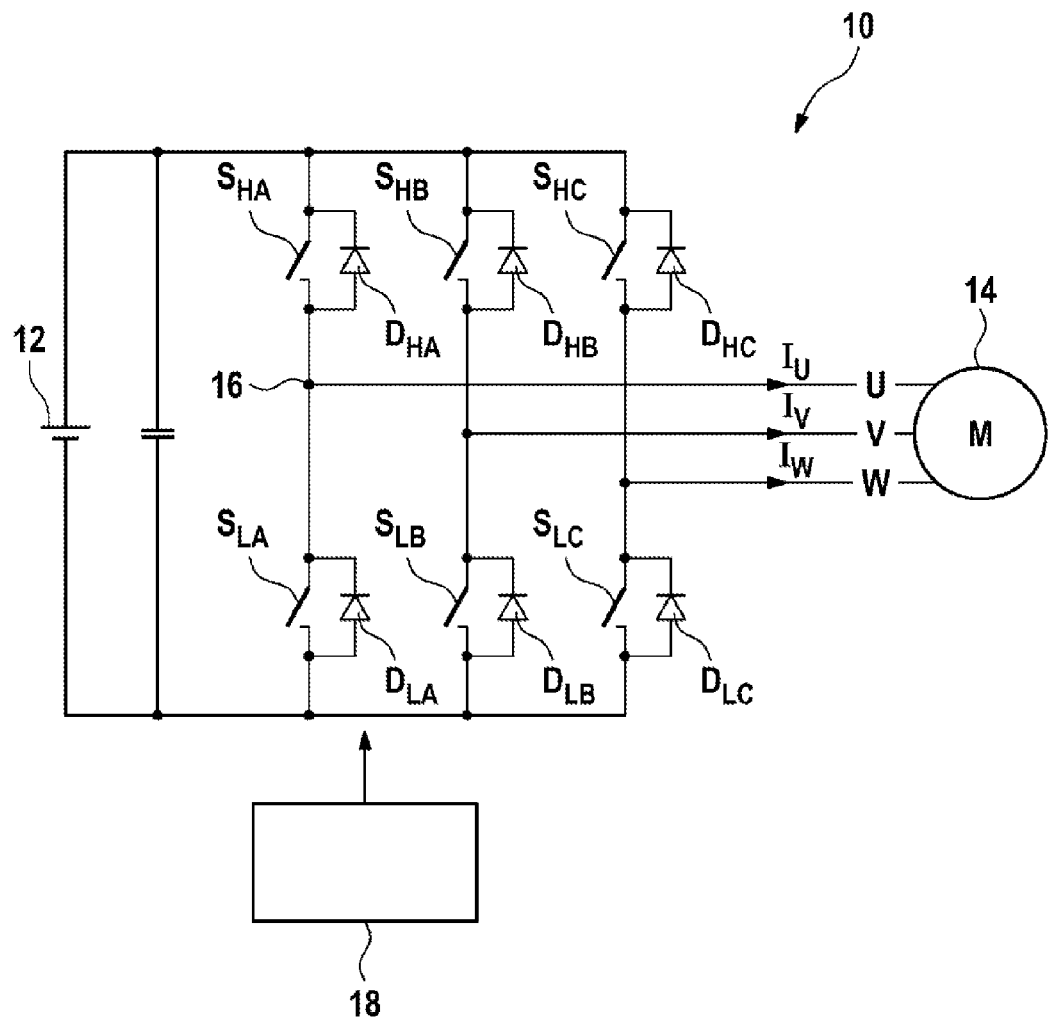
FIG. 1 shows an inverter in schematic form for controlling an electrical load.

FIG. 1 schematically depicts an inverter for controlling an electrical load, in particular an electric machine, which is generally identified by 10.

Inverter 10 is connected to a DC voltage source 12 and is used to supply current in a three-phase form to electrical load 14, which in this case is designed as an electric machine 14, in particular as a synchronous machine 14. Inverter 10 includes three half-bridges which are connected in parallel to DC voltage source 12 and each of which includes two controllable switches S. A half-bridge tap 16 is formed between each of switches S, each of which is connected to a phase conductor of phases U, V, W of electric machine 14.

A flyback diode D is connected in parallel to each of switches S, which makes possible a current flow in the opposite direction.

In FIG. 1, switches S are indicated by SHA, SLA, SHB, SLB, SHC, SLC, corresponding to phase U, V, W which they provide, and according to the allocation to a high potential of DC voltage source 12 or to a low potential of DC voltage source 12. The flyback diodes are correspondingly indicated by DHA, DLA, DHB, DLB, DHC, DLC.

By alternately opening and closing switches S, a control voltage is applied between each of phase conductors U, V, W, so that a phase current IU, IV, IW is correspondingly set in each case, which drives electric machine 14. Inverter 10 is preferably formed by means of semiconductor switches. Switches S of inverter 10 are alternately opened and closed by means of a schematically depicted control unit 18 in order to provide the phase voltages having a certain profile, and to provide a voltage space vector, and to supply electric machine 14 with current corresponding to phase currents IU, IV, IW in the form of a current space vector. The voltage vector is provided by inverter 10, following which the current space vector is set as a function of the controlled load.

Figure 2:
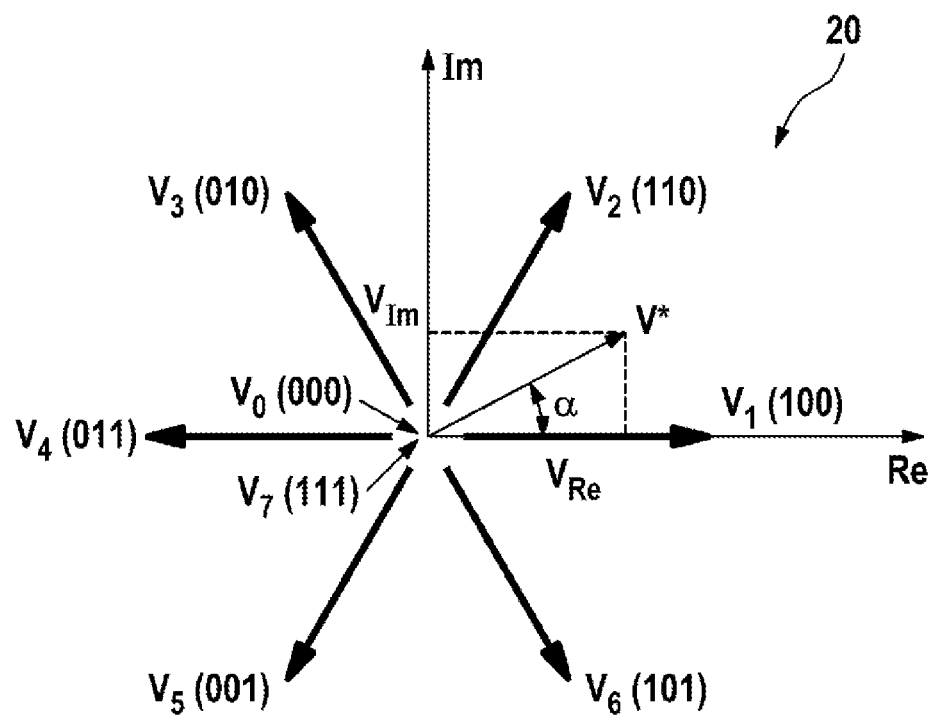
FIG. 2 shows a complex vector diagram for explaining the space vector modulation method for controlling the inverter of an electrical load.

In FIG. 2, a complex vector diagram is depicted for explaining the space vector modulation for controlling electrical load 14 or electric machine 14, and is generally indicated by 20.

In vector diagram 20, a voltage vector V* is depicted having a control angle alpha of electric machine 14. In vector diagram 20, six basic voltage vectors V1, V2, V3, V4, V5, V6 are furthermore depicted, which result if individual switches S or two of switches S of inverter 10 are closed and the electric machine is correspondingly controlled. In order to set voltage vector V*, which in this example has control angle alpha between basic voltage vectors V1 and V2, to have a maximum length, this vector is implemented by alternately controlling inverter 10 corresponding to basic voltage vector V1 and basic voltage vector V2. The two basic voltage vectors V1, V2 are set alternately to have a predefined switching frequency, so that in the case of an equal switch-on duration of basic voltage vectors V1, V2, voltage vector V* having a phase angle of 30° results. If a voltage vector V* having a larger control angle alpha must be set, the switch-on duration of basic voltage vector V2 is correspondingly increased and the switch-on duration of basic voltage vector V1 is decreased. Thus, by controlling switches S of inverter 10 in a clocked manner, it is possible to implement voltage space vector V* having any control angle alpha.

If, as depicted in the case in FIG. 2, voltage vector V* is to be set to have a lower magnitude (lower length) than basic voltage space vectors V1, V2, one of zero-voltage vectors V0, V7 is correspondingly set, in which switches SHA, SHB, SHC on the upper side or switches SLA, SLB, SLC on the lower side of inverter 10 are open. Each of the other switches S is correspondingly closed. Voltage vector V* may correspondingly be implemented via a combination of basic voltage space vectors V1 and V2 and one of zero-voltage vectors V0, V7.

A current space vector I* is set as a function of voltage space vector V*. Current space vector I* has an amplitude and a phase angle which are set as a function of controlled electrical load 14. Phase angle of current space vector I* may be in phase with phase angle α of the voltage space vector V* or have a phase shift.

To supply load 14 or electric machine 14 with current, voltage space vector V* is first provided by setting the different basic voltage space vectors V1 through V6 and zero-voltage vectors V0, V7 consecutively in a rapid sequence, thus causing current space vector I* to be set. The various switches S and the various flyback diodes D of inverter 10 are uniformly loaded in the case of a rapidly rotating voltage space vector V*, in particular more uniformly loaded with respect to phase. If the rotational frequency of voltage space vector V* is very low or zero, for example, in the case of low rotational speeds of electric machine 10, the corresponding switches S and flyback diodes D of inverter 10 of one phase U, V, W are loaded over a long period, so that an overload of the corresponding switches S and flyback diodes D may occur, and switches S and flyback diodes D of inverter 10 are generally non-uniformly loaded, in particular, non-uniformly loaded with respect to phase. In order to prevent an overload of individual switches S and flyback diodes D, actions must be taken to distribute the load to different switches S and flyback diodes D.

Figure 3:
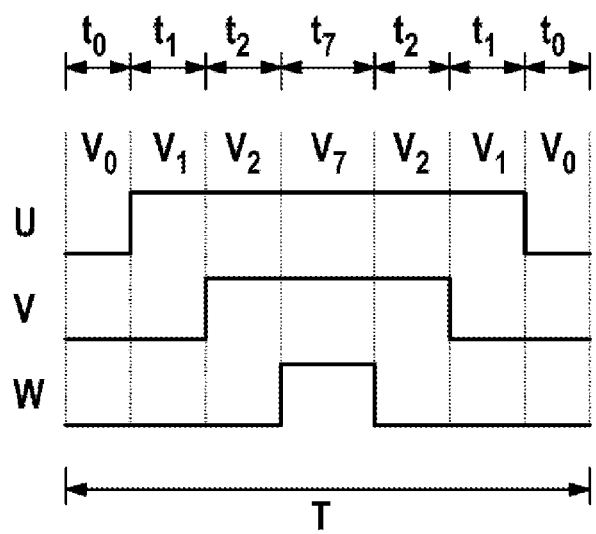
FIG. 3 shows a profile in schematic form of three phase voltages for setting different voltage space vectors.

FIG. 3 depicts profiles of the phase voltage of the three phases U, V, W within one pulse width modulation period T, in order to set basic voltage space vectors V0, V1, V2, V7 in succession. Within pulse width modulation period T, a switch-on duration t0, t1, t2, t7 of the individual basic voltage space vectors V0, V1, V2, V7 may be varied in order to be able to set voltage space vector V* precisely.

The losses and thus the temperature of switches S and flyback diodes D are exclusively a function of magnitude V of voltage space vector V*, phase angle alpha_V, magnitude I of current space vector I*, and phase angle alpha_I.

Figure 4:
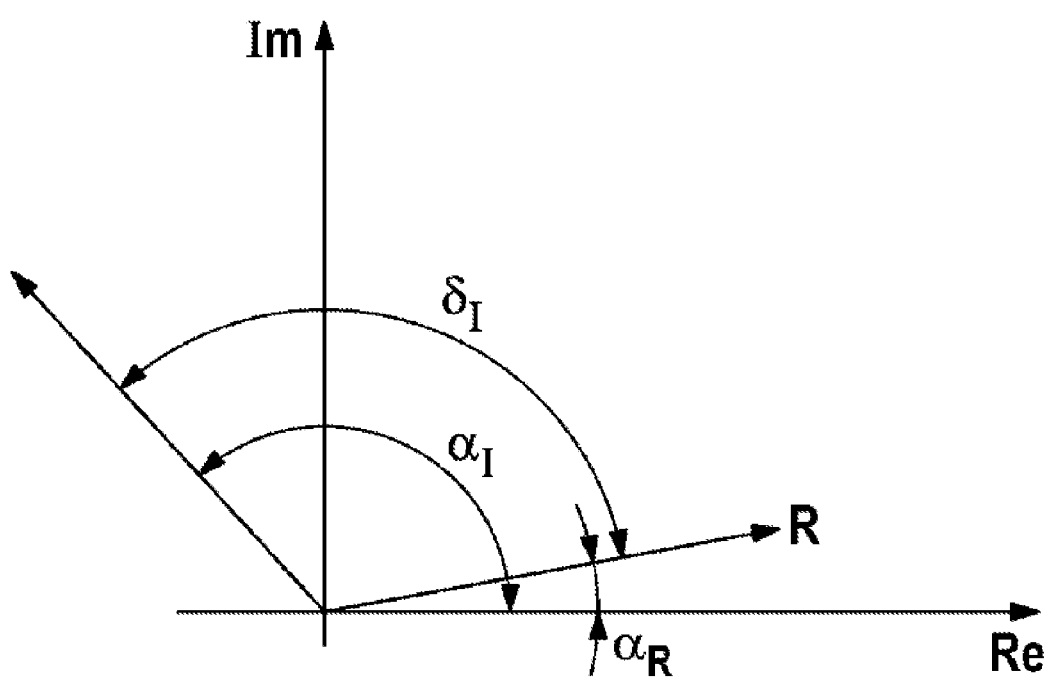
FIG. 4 shows a complex vector diagram for explaining the relationship between a rotor angle of an electric machine and a current space vector for driving the electric machine.

FIG. 4 shows a complex vector diagram for explaining the relationship between a rotor position of electric machine 14 and a current vector I* for driving the rotor of electric machine 14. FIG. 4 schematically depicts the electrical rotor position, which is indicated by R. In this position, the rotor has an electrical rotor angle alpha_R. To drive the rotor of electric machine 14, current vector I* must lead electrical rotor position R in order to exert a corresponding torque on the rotor. For this reason, current space vector I* has a phase angle alpha_I which is greater than rotor angle alpha_R. In FIG. 4, current space vector I* leads the rotor of electric machine 14 by a deviation angle delta_I. The relationship between electrical rotor angle alpha_R and deviation angle delta_I is provided by the formula:

$$\text{alpha\_}I = \text{alpha\_}R + \text{delta\_}I$$

where delta_I is the angle between electrical rotor angle alpha_R of electric machine 14 and current space vector I*.

Deviation angle delta_I is generally firmly predefined as a function of the machine type and the operating point of electric machine 14. In other words, based on electrical rotor position R, a setpoint current space vector is predefined to have a fixed deviation angle delta_I. The setpoint current space vector is set or determined in such a way that inverter 10 and electric machine 14 have an optimal efficiency. Under certain conditions, deviation angle delta_I may be varied without the delivered torque of electric machine 14 being affected, as explained below in detail.

Figure 5:
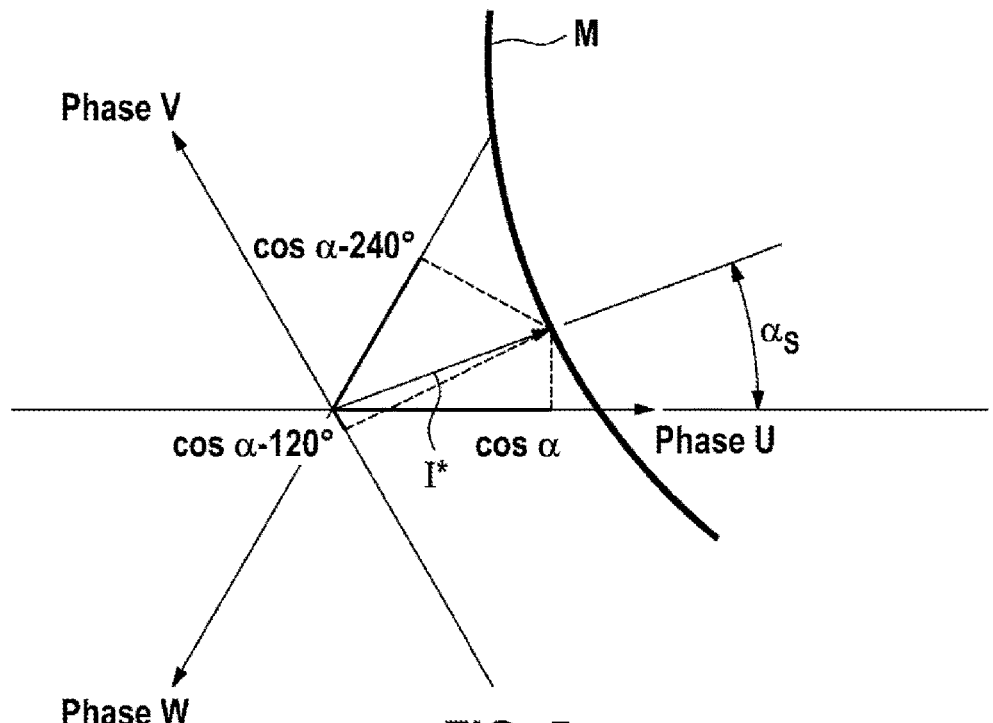
FIG. 5 shows a complex vector diagram in schematic form for setting a current space vector.

FIG. 5 schematically depicts a complex vector diagram of a current space vector I*. Current space vector I* has a magnitude I and a phase angle alpha_S. If inverter 10 which sets current space vector I* is used for controlling electric machine 14, electric machine 14 generates a torque M. In the complex vector diagram from FIG. 5, individual phases U, V, W are depicted having an angle of 120° to each other. A projection of current space vector I* onto the corresponding phases U, V, W corresponds to the current which is set in the associated switches S. The load of the individual switches S or flyback diodes D may thus be read directly via this projection, which is indicated by the dashed lines. In the depicted example from FIG. 5, switch SHA is thus most heavily loaded by phase U, whereas switch SHC of phase W is loaded less than switch SHA, and switch SHB of phase V is very lightly loaded.

Figure 6:
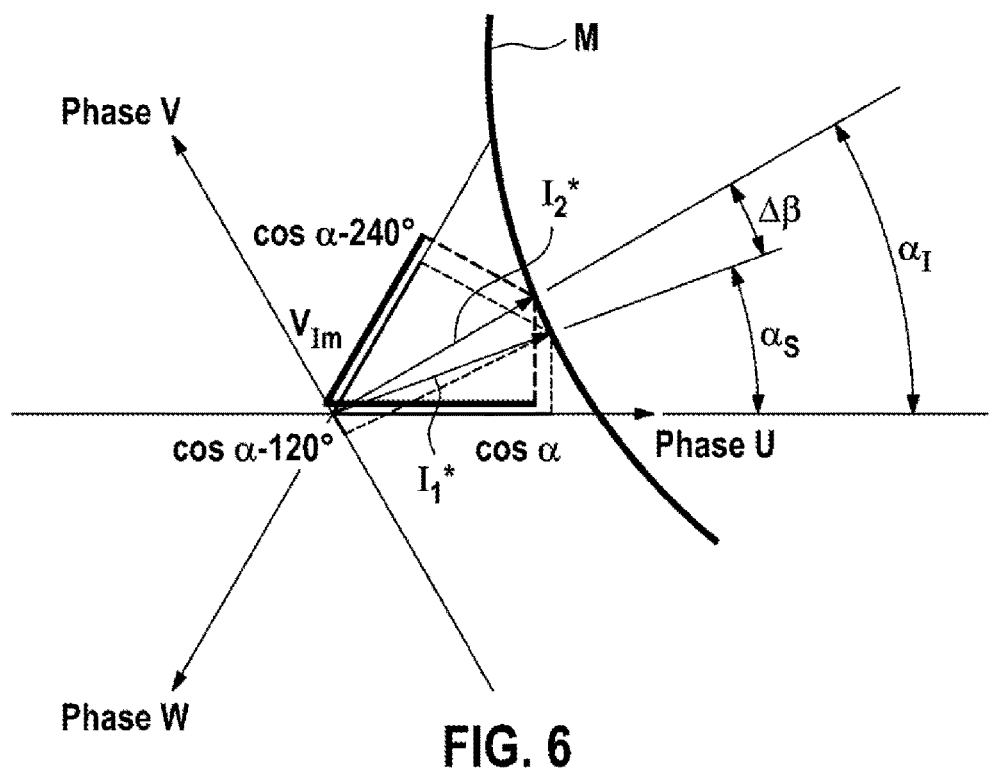
FIG. 6 shows a complex vector diagram for setting an alternative current space vector.

FIG. 6 depicts the provided torque M of the connected electric machine 14 as a curve which simultaneously depicts a curve of a constant torque M. Torque M delivered by electric machine 14 is a function of an angle Delta_I by which current vector I* leads the rotor of electric machine 14, and of amplitude I of current space vector I*:

$$M=f(\text{Delta\_I}, I).$$

It is thus apparent that torque M which is delivered by electric machine 14 is constant if current space vector I* follows the line of constant torque M depicted in FIG. 6.

It is apparent from FIG. 6 that difference angle alpha_I may be varied without the torque delivered by electric machine 14 changing, if current space vector I* follows the line of constant torque M.

Such a variation of the current space vector is schematically depicted in a complex vector diagram in FIG. 6.

The complex vector diagram depicted in FIG. 6 shows a setpoint current space vector I1* having phase angle alpha1 and magnitude I1, and a current space vector I2* having phase angle alpha2 and magnitude I2. Both current space vectors I1*, I2* deliver the same torque M, since they run along the line of equal torque M. Setpoint current space vector I1* is identical to current vector I* from FIG. 5. Current space vector I2* has a phase angle alpha_I which is greater than phase angle alpha_S of setpoint current space vector I1*. The difference between phase angles alpha_S and alpha_I is depicted in FIG. 6 as delta_beta. The size of delta_beta may differ as a function of phase angle alpha_S and may vary at most between +30° and −30°. The projection of current space vector I2* onto the corresponding phase axes of phases U, V, W depicted in FIG. 6 makes it clear that current IU in phase U, i.e., in switch SHA, is reduced relative to I1*, and current IW in phase W, i.e., in switch SHC and flyback diode DLC, is increased. On the whole, the current load caused by the greater magnitude of current space vector I2* is greater than in setpoint current space vector I1*. However, as is apparent from FIG. 6, the load of the most heavily loaded switch SHA and flyback diode DLA may be reduced by this action. As a result, it is possible to reduce peak loads of the most heavily loaded switches S and also of the most heavily loaded flyback diodes D and to distribute the load to other switches S or flyback diodes D. As a result, inverter 10 may be loaded more uniformly with respect to phase. Since current vector I2* follows the line of equal torque M, an identical torque M is provided by electric machine 14, so that this action does not constitute a limitation for the user of electric machine 14, and, for example, no stuttering or a drop in torque M occurs. By setting current space vector I2* which deviates from setpoint current space vector I1*, the losses in the individual phases U, V, W may be distributed, and an overload of individual components of individual phases may thus be prevented. In other words, a more uniform load of phases U, V, W may thus be achieved in order to achieve the same result.

As a result, by providing an alternative current space vector I2* having a phase angle alpha_I deviating from setpoint phase angle alpha_S, a reduction of the most heavily loaded switch SHA and flyback diode DLA or of the most heavily loaded phase U may thus be achieved, and inverter 10 may thus generally be loaded more uniformly. Applied to the method according to the present invention and FIG. 4, this means that if difference angle delta_beta may vary between +30° and −30° about setpoint current space vector I1*, deviation angle delta_I of current space vector I* may vary by 60°, in order to achieve a more uniform load.

If flyback diodes D are heavily loadable, delta_beta may also be set to have a negative value in order to relieve individual switches S. In the control situation depicted in FIG. 1, switch SHA is initially relieved by selecting zero-voltage vector V0, and flyback diode DLA is therefore more heavily loaded. As a result, switches SLB, SLC are also more heavily loaded. For phase angle alpha_1, flyback diode DLA is then most heavily loaded, switch SLC is less heavily loaded, and switch SLB is very lightly loaded. In this situation, flyback diode DLA may be more heavily loaded via a phase angle alpha_2 which is smaller than alpha_1, i.e., having a negative deviation angle delta_beta, whereby, however, switch SLC is relieved and switch SLB is more heavily loaded. Thus, the load of switches SLB and SLC may be distributed more uniformly. However, this occurs at the cost of a heavier load on flyback diode DLA.

In other words, the load is initially transferred from an upper switch SH to a lower flyback diode DL via the selection of a suitable time distribution of zero-voltage vectors V0, V7, and then the load at zero-voltage vectors V0, V7 is distributed to phases U, V, W by setting the deviation angles delta_beta. It is thus generally possible to set the load of switches S and flyback diodes D more uniformly.

Figure 7:
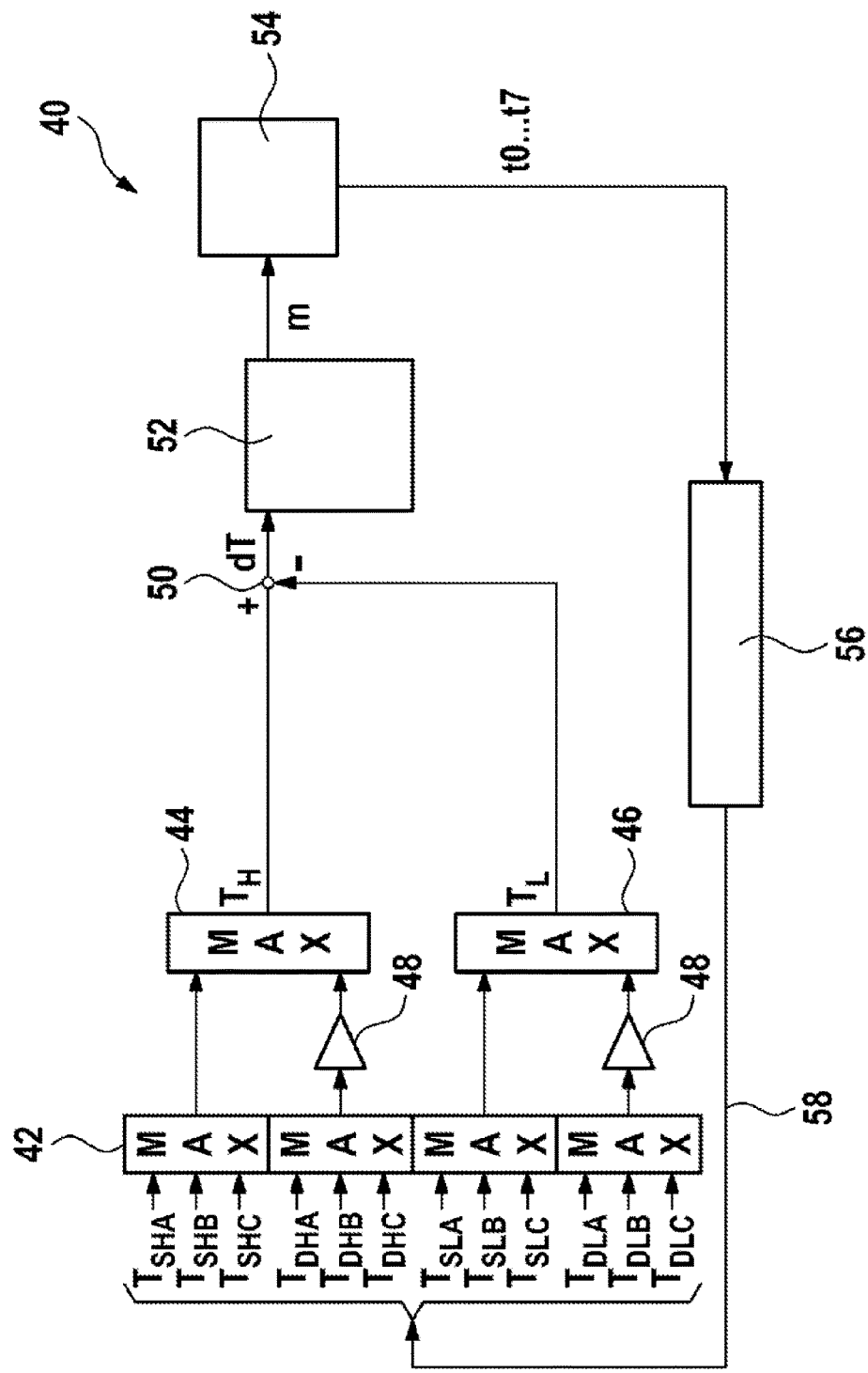
FIG. 7 shows a sequence in schematic form for determining a current space vector based on power dissipations and/or temperatures of the controllable switches of the inverter.

FIG. 6 shows two load cases. FIG. 7 shows a general method which covers all load cases.

FIG. 7 depicts a method for determining phase angle alpha_I based on an estimated or measured $T_D$, $T_s$ of switches S and/or of flyback diodes D and for setting a new current space vector I*. In FIG. 7, the method is generally indicated by 40.

Temperatures $T_D$, $T_s$ of switches S and flyback diodes D are generally used as input values. At 42, the most heavily loaded upper switch SH, the most heavily loaded upper flyback diode DH, the most heavily loaded lower switch SL, and the most heavily loaded lower flyback diode DL are ascertained via temperatures $T_D$, $T_s$. In other words, the particular component having the highest temperature is ascertained. From these temperatures, maximum temperature T_H of the upper switches and/or the upper flyback diodes and maximum temperature T_L of the lower side is ascertained at 44 and 46. Temperature $T_D$ of flyback diodes D is factorized in order to be able to compare the temperatures of switches S and flyback diodes D, as shown at 48. At a summation point 50, difference dT between maximum temperature T_H of the upper side and maximum temperature T_L of the lower side is ascertained. At 52, a modified load setpoint value m is determined as a function of temperature difference dT in order to equalize temperature difference dT accordingly. If temperature difference dT>0, load setpoint value m is reduced, and if temperature difference dT<0, load setpoint value m is increased. As a function of load setpoint value m thus determined, at 54, new switch-on durations t0 through t7 are determined for the subsequent pulse width modulation period T. As shown at 56, modified temperatures $T_D$, $T_s$ of switches S and flyback diodes D are ascertained as a function of the new pulse width modulation period T, and are provided as new input values for method 14 as indicated by feedback 58. As a result, based on the measured or estimated temperature of switches S and/or flyback diodes D, a new load setpoint value m may be determined for each pulse width modulation period T, in order to load the corresponding switches S and flyback diodes D between the upper side and the lower side of inverter 10 more uniformly.

To set phase angle alpha_I of current space vector I* in order to achieve a more uniform load of phases U, V, W, the three most heavily loaded elements, i.e., switches and/or flyback diodes, are thus initially determined, which are generally referred to below as SDA, SDB, SDC.

The switches or flyback diodes SDA, SDB, SDC respectively have a power dissipation PA, PB, PC and a corresponding temperature TA, TB, TC, the losses and the temperature of flyback diodes D being correspondingly factorized in order to be able to be compared to the losses and temperatures of switches S. Power dissipation PA of switch or flyback diode SDA is a function of magnitude I, phase angle (alpha_R+delta_I), load setpoint value m, torque M, and rotational frequency omega:

$$PA=f(I,\text{alpha\_R+delta\_I},m,M,\text{omega})$$

and power dissipation PB of controllable switch or flyback diode SDB is correspondingly:

$$PB=f(I,\text{alpha\_R+delta\_I},m,M,\text{omega}).$$

In order to achieve a uniform load of the controllable switches or the flyback diodes, three of the switches or flyback diodes SDA, SDB, SDC which have highest temperature TA, TB, TC are initially selected. It is assumed that: TA>=TB>=TC. Furthermore, a change function is determined from the power dissipations of switches or flyback diodes SDA, SDB, i.e., the switches and/or the flyback diodes having the two highest temperatures TA, TB:

$$GPS(I,\text{alpha\_R}+\text{delta\_I},m,M,\text{omega})=\frac{\partial}{\partial(\text{delta\_I})}(PA+PB)$$

This change function GPS expresses the change in overall power dissipation PA+PB in the two switches or flyback diodes SDA and SDB as a function of deviation angle delta_I. Accordingly, a second change function GPA may be ascertained:

$$GPA(I,\text{alpha\_R}+\text{delta\_I},m,M,\text{omega})=\frac{\partial}{\partial(\text{delta\_I})}(PA)$$

where change function GPA expresses the change in the power dissipation in switch or flyback diode SDA as a function of deviation angle delta_I.

To set deviation angle delta_I as a function of the power dissipation in switches or flyback diodes SDA, SDB, SDC and respective temperature TA, TB, TC, a distinction is made between three cases.

First, a temperature range delta_T is defined by which the temperatures of controllable switches SDA, SDB may deviate from each other, so that temperatures TA, TB are regarded as equal. Furthermore, a range delta_GP having limits +GP and −GP is defined in order to determine whether change functions GPS, GPA are regarded as positive, negative, or zero.

Case 1: If TA<=TB+delta_T and TA>TC+delta_T, it is assumed that controllable switches or flyback diodes SDA and SDB have an equal temperature. In this case, a distinction is made between three variants: if GPS<−GP, delta_I is increased; if GPS>GP, delta_I is reduced; and if −GP<=GPS<=+GP, delta_I remains constant. In other words, the deviation angle is increased if overall power dissipation PA+PB decreases as deviation angle delta_I increases. If overall losses PA+PB sincrease as deviation angle delta_I increases, deviation angle delta_I is reduced so that overall losses PA+PB may be reduced, and if change function GPS lies in deviation range delta_GP, deviation angle delta_I remains constant, since the target has already been achieved in this case.

Case 2: If TA<=TB+delta_T and TA<=TC+delta_T, it is assumed that the temperatures of the three controllable switches or flyback diodes SDA, SDB, SDC are equal. In this case, deviation angle delta_I remains constant.

Case 3: If TA>TB+delta_T, it is assumed that temperature TA of the controllable switch or flyback diode SDA is higher than temperatures TB, TC of controllable switches or flyback diodes SDB and SDC. This may be due to load setpoint value m having reached the limit 1 or 0. In this case, a distinction is made between three variants: If GPA<−GP, deviation angle delta_I is increased; if GPA>+GP, deviation angle delta_I is reduced, and if −GP<=GPA<=+GP, deviation angle delta_I remains constant. In other words, deviation angle delta_I is increased if power PA of controllable switch or flyback diode SDA having the highest temperature decreases as deviation angle delta_I increases, and if power PA increases as deviation angle delta_I increases, deviation angle delta_I is reduced so that power dissipation PA may be reduced. If GPA lies within the limits of deviation range delta_GP, deviation angle delta_I may remain constant, since the target has already been reached in this case.

With reference to FIG. 6, it is clear that current space vector I1* loads switch SHA and flyback diode DLA most heavily and if in this case, deviation angle delta_I is increased so that a phase angle alpha_I of current space vector I2* is set, the load of switch SHA and flyback diode DLA is reduced and the load of phase W, i.e., of switch SLC and flyback diode DHC, is increased. As a result, by varying deviation angle delta_I, a switch S of the inverter may be relieved and a different switch S of inverter W may be loaded, so that as a result, inverter 10 is loaded more uniformly.

In an alternative specific embodiment of method 40, to determine load setpoint value m, instead of the temperatures of components S, D, loss values are used which are ascertained or determined by integrating the power dissipation of respective component S, D, or by integrating electric current I in respective component S, D, and/or by integrating the square of electric current I$^2$ in respective component S, D over a predefined period.

In another specific embodiment of method 40, to determine the load setpoint value m, instead of the temperatures of components S, D, electrical losses P or electric current I in respective component S, D and/or the square of electric current I$^2$ in respective component S, D are used, each of which is filtered by means of a low-pass filter.

Figure 8:
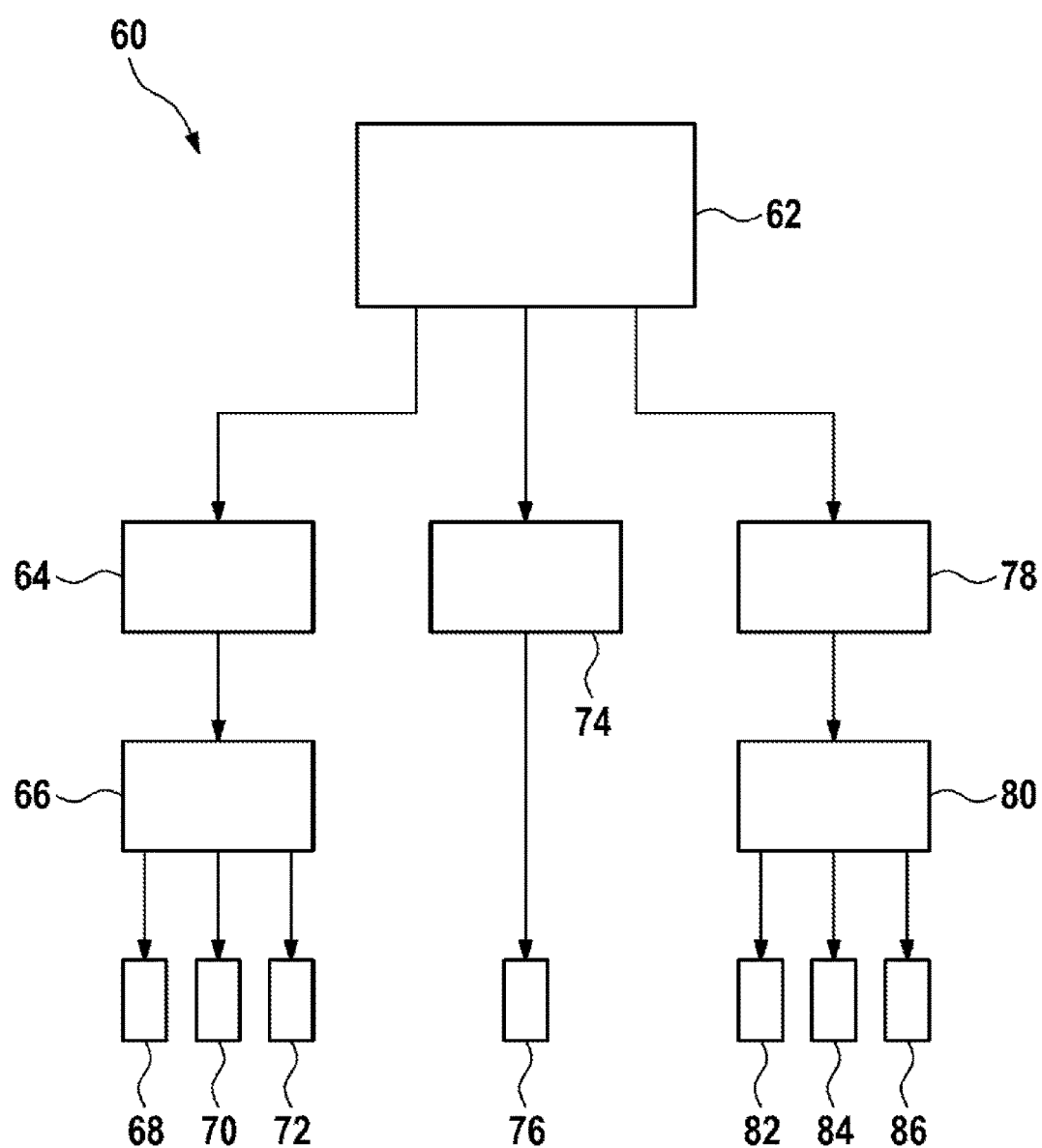
FIG. 8 shows a schematic flow chart for explaining the method according to the present invention.

FIG. 8 depicts a schematic flow chart for explaining the method according to the present invention, which is generally indicated by 60.

Method 60 begins with the selection of the three most heavily loaded switches or flyback diodes SDA, SDB, SDC, and the ratios of temperatures TA, TB, TC are ascertained as shown in 62. If two of controllable switches or flyback diodes SDA and SDB have an equal temperature, method 60 is continued at 64. In this case, the ratio of deviation function GPS to deviation range delta_GP is determined at 66. If GPS<−delta_GP, deviation angle delta_I is increased at 68. If GPS is greater than delta_GP, deviation angle delta_I is reduced at 70, and if GPS lies within deviation range delta_GP, deviation angle delta_I is kept constant at 72.

In the second case, it is determined at 74 that temperatures TA, TB, TC of the three controllable switches or flyback diodes SDA, SDB, SDC are equal, and at 76, deviation angle delta_I is kept constant.

At 78, it is detected whether the temperature of one of the selected switches is higher than the temperatures of the two other selected switches or flyback diodes. In this third case, at 80, change function GPA is ascertained for the switch or the flyback diode having the highest temperature, and is set in relation to deviation range delta_GP. If change function GPA<−GP, deviation angle delta_I is increased at 82. If change function GPA is greater than +GP, deviation angle delta_I is reduced at 84. If change function GPA lies within deviation range delta_GP, deviation angle delta_I is kept constant at 86.

As a result, it is possible to set deviation angle delta_I and load setpoint value m as a function of the temperature of the three most heavily loaded controllable switches and/or the most heavily loaded flyback diodes SDA, SDB, SDC, in order to achieve a more uniform load of inverter 10.

The invention claimed is:

1. A method for operating an inverter by means of space vector modulation, wherein the inverter includes a plurality of controllable switches and is designed to provide a polyphase electric current, wherein a reference phase angle is predefined, the method comprising:

controlling the inverter so that a plurality of different consecutive switching states of the switches is configured, in order to provide the electric current in the form of a current space vector, and the current space vector has a phase angle which deviates from the reference phase angle, wherein a deviation of the phase angle from the reference phase angle is determined as a function of a power dissipation, a temperature, or both power dissipation and temperature of at least one of the switches.

2. The method as claimed in claim 1, wherein the power dissipation and/or the temperature of two or three switches, which have the maximum losses and/or the maximum temperature of all switches is/are taken into account.

3. The method as claimed in claim 2, wherein the deviation is set in such a way that the maximum losses of the two or the three switches are essentially equal or deviate from each other at most by a predefined value.

4. The method as claimed in claim 1, wherein the deviation is determined as a function of a change function of the power dissipation, and wherein the change function forms the change in the power dissipation of at least one switch as a function of the deviation of the phase angle.

5. The method as claimed in claim 4, wherein the deviation is increased if the temperature of one of the switches is greater than the temperature of the other switches and a value of the change function is less than a predefined value range, and wherein the deviation is decreased if a value of the change function is greater than the predefined value range, and wherein the deviation is kept constant if the value of the change function lies within the predefined value range.

6. The method as claimed in claim 4, wherein the change function forms the change in the power dissipation of two switches as a function of the deviation of the phase angle.

7. The method as claimed in claim 6, wherein the deviation is increased if the temperature of two of the three switches is essentially equal and the value of the change function is less than a predefined value range, and wherein the deviation is decreased if the value of the change function is greater than the predefined value range, and wherein the deviation is kept constant if the value of the change function lies within the value range.

8. The method as claimed in claim 4, wherein the change function forms the change in the power dissipation of the switch having the highest temperature, as a function of the deviation of the phase angle.

9. The method as claimed in claim 6, wherein the change function forms the change in the power dissipation of two of the switches having the highest temperature, as a function of the deviation.

10. The method as claimed in claim 1, wherein the inverter further includes a plurality of flyback diodes, and wherein the deviation of the phase angle is furthermore determined as a function of a power dissipation and/or a temperature of at least one of the flyback diodes.

11. The method as claimed in claim 1, wherein an electric machine is controlled by means of the inverter, and wherein the reference phase angle is determined as a function of a rotor angle of the electric machine.

12. A device for controlling an inverter, wherein the inverter includes a plurality of controllable switches which are connected for providing a polyphase electric current as a function of a reference phase angle the device comprising:

a controller configured to control the inverter in such a way that the inverter assumes a plurality of consecutive different switching states of the switches, in order to provide the electric current in the form of a current space vector, and to control the inverter in such a way that the current space vector has a phase angle which deviates from the reference phase angle, wherein the deviation of the phase angle from the reference phase angle is determined based on a power dissipation, a temperature, or both power dissipation and temperature of at least one of the switches.

13. A motor vehicle drive train including at least one electric machine for providing drive power, an inverter for controlling the electric machine, and including a device for controlling the inverter as claimed in claim 12.

* * * * *